US006562764B1

(12) United States Patent
Donaldson et al.

(10) Patent No.: US 6,562,764 B1
(45) Date of Patent: May 13, 2003

(54) INVERT WELL SERVICE FLUID AND METHOD

(76) Inventors: R. Ashley Donaldson, PMB #318, 8524 Highway 6 North, Houston, TX (US) 77095; Steven R. Blattel, 2055 Shadow Rock Dr., Houston, TX (US) 77339; Michael H. Hoff, 16806 Summer Dew La., Houston, TX (US) 77095-1228

( * ) Notice: Subject to any disclaimer, the term of this patent is extended or adjusted under 35 U.S.C. 154(b) by 0 days.

(21) Appl. No.: 09/641,635

(22) Filed: Aug. 17, 2000

Related U.S. Application Data

(60) Provisional application No. 60/181,439, filed on Feb. 10, 2000.

(51) Int. Cl.[7] .............................. E21B 43/04; C09K 3/00
(52) U.S. Cl. ...................... 507/277; 507/203; 507/269; 507/272; 507/925; 507/926; 166/278
(58) Field of Search .......................... 166/278; 507/269, 507/272, 277, 925, 926, 203

(56) References Cited

U.S. PATENT DOCUMENTS

| | | | | |
|---|---|---|---|---|
| 3,064,730 A | * | 11/1962 | Malone .................... | 166/278 |
| 3,675,717 A | * | 7/1972 | Goins, Jr. .................. | 166/278 |
| 4,359,391 A | | 11/1982 | Salathiel et al. ........... | 252/8.55 |
| 4,381,241 A | * | 4/1983 | Romenesko ................ | 507/100 |
| 4,421,656 A | * | 12/1983 | Donatelli et al. ........... | 507/272 |
| 4,836,941 A | | 6/1989 | Thomas .................... | 252/8.555 |
| 5,040,601 A | * | 8/1991 | Karlsson .................... | 166/278 |
| 5,294,353 A | | 3/1994 | Dill .......................... | 252/8.553 |
| 5,295,542 A | * | 3/1994 | Cole et al. .................. | 166/278 |
| 5,333,689 A | * | 8/1994 | Jones et al. ................. | 166/278 |
| 5,472,937 A | | 12/1995 | Fleming et al. ............. | 507/140 |
| 5,480,863 A | | 1/1996 | Oakley et al. ............... | 507/225 |
| 5,556,832 A | | 9/1996 | Van Slyke .................. | 507/203 |
| 5,633,220 A | | 5/1997 | Cawiezel et al. ........... | 507/117 |
| 5,643,858 A | | 7/1997 | Woolley .................... | 507/140 |
| 5,652,200 A | | 7/1997 | Davies et al. ............... | 507/100 |
| 5,710,111 A | * | 1/1998 | Van Slyke .................. | 507/925 |
| 5,728,654 A | | 3/1998 | Dobson, Jr. et al. ........ | 507/272 |
| 5,985,800 A | * | 11/1999 | Patel .......................... | 507/140 |
| 6,006,831 A | | 12/1999 | Schlemmer et al. ........ | 166/254 |
| 6,156,708 A | * | 12/2000 | Brookey et al. ............. | 507/202 |
| 2002/0033258 A1 | * | 3/2002 | Patel .......................... | 166/278 |

FOREIGN PATENT DOCUMENTS

| | | | | |
|---|---|---|---|---|
| EP | 0 561 607 A2 | 3/1993 | ............ | C09K/7/06 |
| WO | WO98/53180 | 11/1998 | | |
| WO | WO 00/56835 | 3/2000 | ............ | C09K/7/06 |

OTHER PUBLICATIONS

A.M. Ezzat & S.R. Blattel, Solids–Free Brine–in–Oil Emulsions for Well Completion, SPE Paper No. 17161, SPE Drilling Engineering, pp. 300–306 (Dec. 1989) plus two associated figures.

* cited by examiner

*Primary Examiner*—Philip Tucker
(74) *Attorney, Agent, or Firm*—Craig W. Roddy; Karen B. Tripp

(57) ABSTRACT

A well service fluid and method using same for brine-sensitive formations is disclosed. The fluid is an invert oil emulsion comprising heavy, solids-free brine, an oil or synthetic, and sufficient emulsifier to create the emulsion. The fluid has particular applicability in gravel packing a horizontal well.

13 Claims, No Drawings

INVERT WELL SERVICE FLUID AND METHOD

RELATED APPLICATION

This application claims priority to U.S. Provisional Patent Application No. 60/181,439, filed Feb. 10, 2000.

BACKGROUND OF THE INVENTION

1. Field of the Invention

This invention generally relates to compositions and methods or processes particularly suited for gravel packing and workover of wells drilled in subterranean hydrocarbon-bearing formations, including without limitation horizontal and directional wells. This invention also generally relates to compositions employed as displacement fluids, packer fluids, and fluids for drilling, especially drilling through pay zones of subterranean hydrocarbon-bearing formations.

2. Description of Relevant Art

As used herein, the terms "well service fluid" or "wellbore fluid," unless indicated otherwise, shall be understood to mean a fluid used for sand control, gravel packing, and workover operations, as well as a fluid employed as a displacement fluid, a packer fluid, or a fluid for drilling and especially drilling through a pay zone. The term "solids-free" as applied to the basic well service fluid shall be understood to mean that no solid materials (e.g., weighting agents or commercial particulates) are present in the wellbore fluid (except that the term is not intended to exclude the presence of drill cuttings in the fluid in the well). The term "horizontal" with respect to a wellbore or to drilling shall be understood to mean at an angle or incline other than 90 degrees from the wellbore surface as the surface is viewed as a plane at ground level. The term "brine-sensitive formation" shall be understood to mean a formation sensitive to brines or that is best suited for oil-based drilling and well service fluids, such as a formation having swelling or sloughing shales, salt, gypsum, anhydrite or other evaporite formation, a hydrogen-sulfide containing formation and hot (greater than 300 degrees Fahrenheit) holes.

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

A drilling fluid comprising liquid, usually water and/or oil or synthetic oil or other synthetic material or synthetic fluid ("synthetic"), with solids in suspension is typically called a drilling fluid or mud. A non-aqueous based drilling fluid typically contains oil or a synthetic as the continuous phase and may also contain water which is dispersed in the continuous phase by emulsification so that there is no distinct layer of water in the fluid. Oil or synthetic-based muds are normally used to drill swelling or sloughing shales, salt, gypsum, anhydrite or other evaporite formations, hydrogen sulfide-containing formations, and hot (greater than 300 degrees Fahrenheit) holes, but may be used in other holes penetrating a subterranean formation as well.

Gravel packing is becoming an increasingly common or favored method of completing a wellbore (as opposed to cementing and perforating a well). Well service fluids are used to carry the gravel into the well and place it at the gravel packing site. As used herein, the term "gravel," shall be understood to include not only natural gravel but other proppant type materials, natural and man made or synthetic, such as, for example, sand, pebbles, and synthetic beads. Generally, the well's bottom hole pressure, which must be equalized, determines the minimal density of the fluid needed.

A solids free water or brine, typically called "clear brine," has been commonly used to carry gravel for gravel packing a well and for other well servicing operations. Such fluid typically contains a zinc or calcium or sodium halide, such as sodium chloride, dissolved therein to provide the desired density to the fluid.

However, when a well has been drilled with an oil or synthetic-based drilling fluid, "clear brine" fluids can be incompatible with the drilling fluid or with the subterranean formation having characteristics that necessitated the use of the oil or synthetic-based drilling fluid such as a brine—sensitive formation. Clean hydrocarbon oils would likely provide the most compatible or least damaging completion fluids, but such oils do not have the required densities and do not readily dissolve compounds that could provide the required densities.

A need exists for an oil or synthetic-based, solids-free, well service fluid that is compatible with oil or synthetic-based drilling fluids and brine-sensitive formations and that has the ability to be weighted to equal or greater than the bottomhole pressure requirements.

SUMMARY OF THE INVENTION

A well service fluid has been discovered that can be made compatible with oil or synthetic-based drilling fluids and brine sensitive formations. This fluid comprises a solids-free, invert emulsion comprising heavy brine, synthetic or oil, and an emulsifier sufficient for facilitating formation of an invert emulsion. The brine forms the internal phase of the emulsion and the synthetic forms the external phase of the emulsion.

Preferably, synthetic is selected that is compatible with the oil or synthetic drilling fluid used to drill the wellbore to be serviced. The brine is made heavy with halide salts, preferably calcium bromide or zinc bromide or mixtures thereof, or cesium formate. Such halides confer density to the emulsion fluid without need for addition of other materials or solids.

In the method of the invention, the emulsion of this invention for servicing a wellbore is preferably added directly to the wellbore, without dilution by or addition to other fluids. An example of a well service or treatment particularly suitable for the invention is gravel packing. Other suitable treatments include workover operations and use of the emulsions as packer fluids and displacement fluids.

The invention has particular utility in horizontal wells.

DETAILED DESCRIPTION OF PREFERRED EMBODIMENTS

The present invention provides an improved well treatment method and composition employing water-in-oil emulsions, also called invert emulsions. These emulsions of the invention are especially useful for gravel packing and workover operations. The emulsions of the invention may also be useful as a packer fluid, a production fluid, a displacement fluid, and a drilling fluid, especially for drilling through the pay zone of a subterranean hydrocarbon-bearing formation. It is believed that the emulsions of the invention may further have utility in a single fluid system for drilling and completing wells, especially for construction and production of horizontal wells and wells penetrating brine-sensitive formations.

The internal phase of the emulsion of the invention comprises a high density brine ("heavy brine"), made heavy or dense with halide salts, such as, for example, calcium bromide or zinc bromide. The external phase of the emulsion comprises synthetic or oil that is preferably compatible with oil or synthetic-based drilling fluids. An emulsifier blended with the brine and the oil facilitates formation of the emulsion. The brine portion of the emulsion dissolves salts to enhance and control the density of the fluid, while the oil portion of the emulsion allows for compatibility with oil-based drilling fluids and with brine-sensitive formations.

Most preferably, filtered brine or "clear brine" is used for the emulsion. Preferred oils or synthetics for the emulsion are synthetic oils such as olefins and n-alkanes and some crude oils (preferably lighter crude oils) and distilled hydrocarbons. Preferred emulsifiers comprise polyolefin amides and alkeneamides. Preferably, the emulsifier will be relatively passive, stable at temperatures as high as 400 degrees Fahrenheit, and suitable for use with a wide variety of oils, synthetics and produced crudes (or crude oils). Also preferably, the emulsifer will be useful in high density brines. An example of such a preferred emulsifier is "BromiMul™", an oil wetting nonionic surfactant emulsifier available from Baroid, a Halliburton company, in Houston, Tex. Preferred densities of salts in the emulsions may be determined or controlled by the quantity of halide salt added to the brine and the particular halide chosen. Generally, the more salt added, the greater the density, and the heavier the salt added (depending on its composition), the greater the density. For example, preferably about 10 to 15 or more pounds per gallon of calcium bromide or zinc bromide may be used for the invention, while up to or about 20 or more pounds per gallon of cesium formate may alternatively be used. Various quantities of oil or synthetic and water or brine may be used, so long as an invert (water-in-oil) emulsion is created and the rheology of the fluid is suitable for the intended use. For gravel packing, a 50:50 ratio of brine and oil is preferred, having a density preferably in the range of about 9 to about 13 pounds per gallon. The quantity of emulsifier used is an amount sufficient to facilitate formation of the emulsion. Generally, about 5 to about 20 pounds per barrel is sufficient. An advantage of the invention is that the emulsion provides fluid density without need for the addition of solids commonly used in the industry to add density to well service fluids and drilling fluids to satisfy bottomhole pressure requirements.

After preparation, the invert emulsions are preferably used directly for the well service treatment. For example, for gravel packing, the gravel is carried by the emulsions comprising the well service fluid into the wellbore site for gravel packing. The emulsions will, however, contact drilling mud or drilling fluid used in the well and the oil or synthetic comprising the emulsion should preferably be compatible with the oil or synthetic in the drilling mud. Best results are expected to be obtained when the emulsions are used in gravel packing where the gravel is being continuously deposited during the packing operation.

Experiments

Samples of water-in-oil invert emulsions were prepared using a solids free or filtered brine, and PETROFREE LE™ synthetic base oil, obtained from Baroid Technology, Inc., a Halliburton Company, Houston, Tex., in oil to water ratios ("OWR") of 50:50, 40:60, and 30:70, and a Bromi-Mul™ emulsifier, obtained from Halliburton Energy Services, Inc., Houston, Tex. Calcium bromide (14.2 pounds per gallon) or calcium/zinc bromide (19.2 pounds per gallon) was added to the samples to increase the densities of the fluids. The term "calcium/zinc bromide" as used herein shall be understood to mean a mixture of calcium bromide and zinc bromide.

All samples of the emulsions were multi-mixed for 30 minutes and rolled overnight at 150 degrees Fahrenheit before testing. Rheology was measured at 120 degrees Fahrenheit.

As shown in Table 1, the 50:50 OWR fluids produced emulsions with densities of 10.2 pounds per gallon using calcium bromide and 12.2 pounds per gallon using calcium/zinc bromide.

As shown in Table 2, the 40:60 OWR fluids produced emulsions with densities of 11.0 pounds per gallon using calcium bromide and 13.7 pounds per gallon using calcium/zinc bromide. As shown in Table 3, the 30:70 OWR fluids produced emulsions with densities of 11.6 pounds per gallon with calcium bromide and 14.7 pounds per gallon with calcium/zinc bromide. The viscosity of the 30:70 OWR fluids was too high for the intended use of gravel packing but the viscosities of the 40:60 OWR fluids and the 50:50 OWR fluids were suitable.

All samples were static aged at 300 degrees Fahrenheit for 16 hours and all exhibited some top-oil separation--the 50:50 OWR fluid exhibited the most--but the emulsions did not break. When stirred, the emulsions remained stable at ambient temperature.

In testing with sand and gravel for use in gravel packing horizontal wells, the emulsions were found to be particularly suitable for gravel packing operations where continuous deposition of proppant grains is expected and needed. Favorably, the emulsions tested were not successful with static sand suspension (i.e., the emulsions did not suspend sand in static conditions). These test results are desired for emulsions intended for use in horizontal or directional wells, where gravity does not facilitate deposition of suspended gravel and thus suspended gravel is undesirable.

TABLE 1

(50/50 OWR Samples)

| Sample No. | 1 | 2 | 3 | 4 | 5 | 6 |
|---|---|---|---|---|---|---|
| PETROFREE LE ™, bbl | 0.5 | 0.5 | 0.5 | 0.5 | 0.5 | 0.5 |
| 14.2 lb/gal $CaBr_2$, bbl | 0.5 | 0.5 | 0.5 | — | — | — |
| 19.2 lb/gal $CaBr_2/ZnBr_2$, bbl | — | — | — | 0.5 | 0.5 | 0.5 |
| BROMI-MUL, lb | 5 | 10 | 15 | 5 | 10 | 15 |
| Roll samples 150° F. 16 hrs. Test at 120° F. | | | | | | |
| 600 rpm | 34 | 41 | 42 | 26 | 30 | 36 |
| 300 rpm | 17 | 21 | 22 | 13 | 14 | 18 |
| 200 rpm | 11 | 14 | 14 | 9 | 10 | 12.5 |
| 100 rpm | 6 | 7 | 7 | 5 | 5 | 6.5 |
| 6 rpm | 0.5 | 0.5 | 0.5 | 0.5 | 0.5 | 1 |
| 3 rpm | 0.5 | 0.5 | 0.5 | 0.5 | 0.5 | 0.5 |
| Plastic viscosity, cP | 17 | 20 | 20 | 13 | 14 | 18 |
| Yield point, lb/100 $ft^2$ | 0 | 1 | 2 | 0 | 0 | 0 |
| 10 sec gel, lb/100 $ft^2$ | 0 | 0 | 0 | 0 | 0 | 0 |
| 10 min gel, lb/100 $ft^2$ | 0 | 0 | 0 | 0 | 0 | 0 |
| Electrical stability, volts | 160 | 168 | 170 | 65 | 80 | 85 |
| Static aged 300° F. 16 hrs. Multi-mixed 10 min Test at 120° F. | | | | | | |
| 600 rpm | 34 | 40 | 42 | 33 | 33 | 37 |
| 300 rpm | 17 | 20 | 21 | 17 | 17 | 19 |
| 200 rpm | 12 | 14 | 15 | 12 | 12 | 13 |

TABLE 1-continued (50/50 OWR Samples)

| Sample No. | 1 | 2 | 3 | 4 | 5 | 6 |
|---|---|---|---|---|---|---|
| 100 rpm | 6 | 7 | 7 | 6 | 6 | 7 |
| 6 rpm | 0.5 | 1 | 1 | 1 | 0.5 | 1 |
| 3 rpm | 0.5 | 0.5 | 0.5 | 0.5 | 0.5 | 0.5 |
| Plastic viscosity, cP | 17 | 20 | 21 | 16 | 16 | 18 |
| Yield point, lb/100 ft$^2$ | 0 | 0 | 0 | 1 | 1 | 1 |
| 10 sec gel, lb/100 ft$^2$ | 0 | 0 | 0 | 0 | 0 | 0 |
| 10 min gel, lb/100 ft$^2$ | 0 | 0 | 0 | 0 | 0 | 0 |
| Measured density, lb/gal | — | 10.2 | — | — | 12.2 | — |

TABLE 2

(40/60 OWR Samples)

| Sample No. | 1 | 2 | 3 | 4 |
|---|---|---|---|---|
| PETROFREE LE ™, bbl | 0.4 | 0.4 | 0.4 | 0.4 |
| 14.2 lb/gal CaBr$_2$, bbl | 0.6 | 0.6 | — | — |
| 19.2 lb/gal CaBr$_2$/ZnBr$_2$, bbl | — | — | 0.6 | 0.6 |
| BROMI-MUL, lb | 10 | 15 | 10 | 15 |
| Roll samples 150° F. 16 hrs., Test at 120° F. | | | | |
| 600 rpm | 100 | 133 | 76 | 96 |
| 300 rpm | 53 | 71 | 40 | 50 |
| 200 rpm | 36 | 48 | 27 | 35 |
| 100 rpm | 19 | 26 | 14 | 16 |
| 6 rpm | 1.5 | 2 | 1 | 1.5 |
| 3 rpm | 1 | 1 | 0.5 | 1 |
| Plastic viscosity, cP | 47 | 52 | 36 | 46 |
| Yield point, lb/100 ft$^2$ | 6 | 9 | 4 | 4 |
| 10 sec gel, lb/100 ft$^2$ | 1 | 1 | 1 | 1 |
| 10 min gel, lb/100 ft$^2$ | 1 | 1 | 1 | 1 |
| Electrical stability, volts | 250 | 295 | 90 | 100 |
| Static aged 300° F. 16 hrs, Multi-mixed 10 min, Test at 120° F. | | | | |
| 600 rpm | 117 | 133 | 74 | 96 |
| 300 rpm | 62 | 72 | 39 | 45 |
| 200 rpm | 42 | 48 | 26 | 31 |
| 100 rpm | 22 | 25 | 14 | 16 |
| 6 rpm | 2 | 2 | 1.5 | 1.5 |
| 3 rpm | 1 | 1 | 1 | 1 |
| Plastic viscosity, cP | 55 | 62 | 35 | 41 |
| Yield point, lb/100 ft$^2$ | 7 | 9 | 4 | 4 |
| 10 sec gel, lb/100 ft$^2$ | 1 | 1 | 1 | 1 |
| 10 min gel, lb/100 ft$^2$ | 2 | 2 | 1 | 1 |
| Measured density, lb/gal | — | 11.0 | — | 13.7 |

TABLE 3

(30/70 OWR Samples)

| Sample No. | 1 | 2 | 3 | 4 |
|---|---|---|---|---|
| PETROFREE LE ™, bbl | 0.3 | 0.3 | 0.3 | 0.3 |
| 14.2 lb/gal CaBr$_2$, bbl | 0.7 | 0.7 | — | — |
| 19.2 lb/gal CaBr$_2$/ZnBr$_2$, bbl | — | — | 0.7 | 0.7 |
| BROMI-MUL, lb | 10 | 15 | 10 | 15 |
| Roll samples 150° F. 16 hrs., Test at 120° F. | | | | |
| 600 rpm | Off scale | Off scale | Off scale | Off scale |
| 300 rpm | Off scale | Off scale | 195 | 280 |
| 200 rpm | 278 | Off scale | 147 | 210 |
| 100 rpm | 186 | 204 | 90 | 129 |
| 6 rpm | 39 | 41 | 125 | 17 |
| 3 rpm | 27 | 28 | 8 | 10 |
| Plastic viscosity, cP | — | — | — | — |
| Yield point, lb/100 ft$^2$ | — | — | — | — |
| 10 sec gel, lb/100 ft$^2$ | 27 | 28 | 7 | 10 |
| 10 min gel, lb/100 ft$^2$ | 29 | 30 | 8 | 11 |
| Electrical stability, volts | 180 | 200 | 90 | 100 |

TABLE 3-continued (30/70 OWR Samples)

| Sample No. | 1 | 2 | 3 | 4 |
|---|---|---|---|---|
| Static aged 300° F. 16 hrs, Multi-mixed 10 min, Test at 120° F. | | | | |
| 600 rpm | Off scale | Off scale | Off scale | Off scale |
| 300 rpm | Off scale | Off scale | 244 | 299 |
| 200 rpm | Off scale | Off scale | 189 | 229 |
| 100 rpm | 230 | 230 | 121 | 147 |
| 6 rpm | 59 | 55 | 22 | 26 |
| 3 rpm | 44 | 41 | 14 | 18 |
| Plastic viscosity, cP | — | — | — | — |
| Yield point, lb/100 ft$^2$ | — | — | — | — |
| 10 sec gel, lb/100 ft$^2$ | 44 | 41 | 14 | 18 |
| 10 min gel, lb/100 ft$^2$ | 47 | 42 | 15 | 19 |
| Measured density, lb/gal | 11.6 | — | 14.7 | — |

Samples of the emulsions of this invention were found to be compatible with a commonly used oil or synthetic-based drilling fluid, COREDRIL-N™, obtained from Halliburton Energy services, Inc., Houston, Tex. An 11.0 lb/gal. COREDRIL-N fluid was prepared with the formulation shown in Table 4, and placed in an API filter press.

TABLE 4

| PETROFREE LE ™, bbl | 0.7900 |
|---|---|
| EZ-CORE ™, lb | 3 |
| Lime, lb | 3 |
| Bentone 34, lb | 8 |
| DURATONE ® HT, lb | 5 |
| BARABLOK ™, lb | 5 |
| BARACARB ® 5, lb | 35 |
| Barite, lb | 182 |

Three milliliters of filtrate were collected at 100 psi over 30 minutes. The cell was then opened and the COREDRIL-N fluid was poured out into ajar leaving the filter cake at the bottom of the cell. A sample of a 40/60 OWR invert emulsion of this invention comprising calcium bromide and 15 pounds of BROMI-MUL™ fluid was poured into the cell on top of the COREDRIL-N™ filter cake. The cell was repressured and filtrate collected overnight. After 16 hours approximately 5 cc of filtrate had been collected. The collected filtrate was dark brown in color and normal in appearance. This filtrate was mixed with the filtrate previously collected from the COREDRIL-N™ sample. The two filtrates were compatible. A small amount of the emulsion was mixed with the combined filtrates and was again compatible.

This compatibility test was repeated, substituting for the emulsion used in the previous test a 40/60 OWR invert emulsion of this invention comprising calcium/zinc bromide and BROMI-MUL.™ Tests results were similar, indicating no incompatibility.

Samples of emulsions of this invention were tested for filtration ability and passed satisfactorily. Two 40/60 OWR invert emulsions were prepared with BROMI-MUL™, one comprising 14.2 lb/gal. calcium bromide and the other comprising 19.2 lb/gal. calcium/zinc bromide, as shown in formulation Table 5.

TABLE 5

| PETROFREE LE ™, bbl | 0.4 | 0.4 |
|---|---|---|
| 14.2 lb/gal CaBr$_2$, bbl | 0.6 | — |
| 19.2 lb/gal CaBr$_2$/ZnBr$_2$, bbl | — | 0.6 |

TABLE 5-continued

| BROMI-MUL ™, lb | 10 | 10 |
| Filtration time, 350 ml, minutes | 6.5 | 2.5 |

Each sample was placed in an API filtration cell containing 1.6 micron glass filter fiber paper. Filtration was continued until all of the sample passed through the paper. The filtered sample containing calcium bromide showed good stability with no breakdown of the emulsion. The sample containing calcium/zinc bromide showed some emulsion breakdown 24 hours after filtration.

Samples of emulsions of this invention were tested for toxicity and passed satisfactorily.

Tests were also conducted to ascertain the effect if any of the invert emulsions of the invention on the subterranean formation. That is, the emulsion was tested for filter cake erosion and return permeability. These tests were conducted with core floods in a laboratory. The invert emulsion was comprised of ELF-GIRASSOL™ (available from Elf Aquitaine in France), which is a diesel oil, heavy brine, and BROMI-MUL™ emulsifier. A filter cake was deposited on the core under pressure. The core was an inert, uniform ceramic material to simulate formation material. The emulsion was circulated in the core as in a gravel pack situation and did not erode the cake to the point of lost circulation. Also, the return permeability with the emulsion was greater than the return permeability with the drilling fluid used to build the filter cake. These tests showed the emulsion could be used for gravel packing without causing formation damage.

Further tests were conducted to simulate a field treatment, particularly gravel packing, using invert emulsions according to the present invention. These tests employed a 12 foot acrylic cylinder with a wire wrapped screen inside. A base line water pack preceded the test with a 9.4 pounds per gallon (ppg) invert emulsion of this invention as a gravel pack fluid. The emulsion comprised 181 gallons HDF-2000™ (a mineral oil available from Total of France), 105 gallons calcium bromide solids-free brine (having 14.2 pounds per gallon calcium bromide), and 14 gallons BROMI-MUL™ emulsifier. In the test, the gravel placement with the emulsion was steady and even, comparable to and even better than the gravel placement with water or brine as commonly used for gravel packing.

This emulsion further tested successfully for filterability in a diatomaceous earth filter press. Fluid samples were taken after each pass of the emulsion through the filter press. The emulsion maintained stability and was filterable even after several passes through the filter. Further, the emulsion did not damage the permeability of the 20/40-mesh sand pack used in the test. Analysis of the emulsion samples caught after each pass through the filter press showed that the samples maintained their rheological properties. After the samples were allowed to sit undisturbed (static) for over 24 hours, the emulsion samples showed little if any separation of the synthetic and brine phases, further indicating their stability and success in this test.

The foregoing description of the invention is intended to be a description of a preferred embodiment. Various changes in the details of the described composition and method can be made without departing from the intended scope of this invention as defined by the appended claims.

We claim:

1. A method for gravel packing a horizontal wellbore penetrating a subterranean brine-sensitive formation, wherein said wellbore was drilled with an oil-based or synthetic-based drilling fluid, said method comprising:

(a) providing an invert emulsion comprising:
oil or synthetic compatible with said drilling fluid; clear brine comprising halide salts or cesium formate in sufficient quantities to give the emulsion a density suitable for carrying gravel, without suspending said gravel when static; and an emulsifier in sufficient quantities to facilitate formation of an emulsion;

(b) without adding or mixing of said emulsion with other fluids, injecting said emulsion with gravel into said wellbore such that said emulsion is a carrier for said gravel; and (c) continuously depositing said gravel on the sides of said wellbore until said gravel packing of said wellbore is complete.

2. The method of claim 1 wherein said halide salts are selected from the group consisting of calcium bromide, zinc bromide, and mixtures of calcium bromide and zinc bromide.

3. The method of claim 1, wherein said emulsion has a density of about 9 to about 20 pounds per gallon.

4. A method for gravel packing a horizontal wellbore penetrating a subterranean brine-sensitive formation, wherein said wellbore was drilled with an oil-based or synthetic-based drilling fluid, said method comprising:

(a) providing an invert emulsion comprising:
oil or synthetic compatible with said drilling fluid; clear brine comprising halide salts or cesium formate in sufficient quantities to give the emulsion a density suitable for carrying gravel, without suspending said gravel when static; and an emulsifier in sufficient quantities to facilitate formation of an emulsion, wherein said emulsion comprises about 50 to about 60 percent brine as the internal phase of said emulsion and about 40 to about 50 percent oil or synthetic as the external phase of said emulsion;

(b) without adding or mixing of said emulsion with other fluids, injecting said emulsion with gravel into said wellbore such that said emulsion is a carrier for said gravel; and (c) continuously depositing said gravel on the sides of said wellbore until said gravel packing of said wellbore is complete.

5. The method of claim 1 further comprising about 5 to about 20 pounds per barrel of said emulsifier in said emulsion.

6. The method of claim 1 where said emulsion is solids-free.

7. The method of claim 1 where said brine is heavy brine.

8. The method of claim 1 where said gravel packing is in a pay zone of said formation.

9. The method of claim 1 wherein said emulsifier is a non-ionic surfactant.

10. The method of claim 1 wherein said emulsifier is stable at temperatures as high as about 400 degrees Fahrenheit.

11. A method for gravel packing a horizontal wellbore penetrating a subterranean brine-sensitive formation, wherein said wellbore was drilled with an oil-based or synthetic-based drilling fluid, said method comprising:

(a) providing an invert emulsion comprising:
oil or synthetic compatible with said drilling fluid; clear brine comprising halide salts or cesium formate in sufficient quantities to give the emulsion a density suitable for carrying gravel, without suspending said gravel when static; and an emulsifier selected from the group comprising polyolefin amides, alkenamides, and mixtures thereof in sufficient quantities to facilitate formation of an emulsion;

(b) without adding or mixing of said emulsion with other fluids, injecting said emulsion with gravel into said wellbore such that said emulsion is a carrier for said gravel; and (c) continuously depositing said gravel on the sides of said wellbore until said gravel packing of said wellbore is complete.

12. The method of claim 1 wherein said emulsion does not substantially erode any filter cake on said wellbore during said continuous gravel packing of said wellbore.

13. The method of claim 1 wherein said oil or synthetic is selected from the group comprising olefins, n-alkanes, light crude oils, distilled hydrocarbons, and mixtures thereof.

* * * * *

UNITED STATES PATENT AND TRADEMARK OFFICE
CERTIFICATE OF CORRECTION

PATENT NO. : 6,562,764 B1
DATED : May 13, 2003
INVENTOR(S) : R. Ashley Donaldson et al.

It is certified that error appears in the above-identified patent and that said Letters Patent is hereby corrected as shown below:

<u>Title page,</u>
Item [73], insert:
-- Assignee: Halliburton Energy Services, Inc., Duncan, OK (US). --

Signed and Sealed this

Twenty-fifth Day of November, 2003

JAMES E. ROGAN
*Director of the United States Patent and Trademark Office*